United States Patent
Lanzendoerfer et al.

(10) Patent No.: US 11,975,852 B2
(45) Date of Patent: May 7, 2024

(54) ELECTRICALLY POWERED ROTARY-WING AIRCRAFT

(71) Applicant: AIRBUS URBAN MOBILITY GMBH, Munich (DE)

(72) Inventors: Silvio Lanzendoerfer, Nordendorf (DE); Gero Preisser, Rain/Etting (DE); Michael Geiss, Moettingen (DE)

(73) Assignee: AIRBUS URBAN MOBILITY GMBH, Munich (DE)

( * ) Notice: Subject to any disclaimer, the term of this patent is extended or adjusted under 35 U.S.C. 154(b) by 5 days.

(21) Appl. No.: 17/673,595

(22) Filed: Feb. 16, 2022

(65) Prior Publication Data

US 2022/0267016 A1    Aug. 25, 2022

(30) Foreign Application Priority Data

Feb. 25, 2021    (EP) ..................... 21400005

(51) Int. Cl.
*B64D 27/24*    (2006.01)
*B60L 50/60*    (2019.01)
(Continued)

(52) U.S. Cl.
CPC .............. *B64D 27/24* (2013.01); *B60L 50/66* (2019.02); *B64C 27/22* (2013.01); *B64C 27/68* (2013.01);
(Continued)

(58) Field of Classification Search
CPC ...... Y02T 10/70; Y02T 50/60; B60L 2200/10; B60L 50/40; B60L 50/66; H02J 1/10;
(Continued)

(56) References Cited

U.S. PATENT DOCUMENTS

| | | | |
|---|---|---|---|
| 11,530,033 B2 * | 12/2022 | Preisser | ................... B64C 27/14 |
| 2020/0010187 A1 * | 1/2020 | Bevirt | .................... B64D 27/24 |

(Continued)

FOREIGN PATENT DOCUMENTS

| | | |
|---|---|---|
| EP | 3702277 A1 | 9/2020 |
| EP | 3757014 A1 | 12/2020 |
| WO | 2019232472 A1 | 12/2019 |

OTHER PUBLICATIONS

European Search Report for European Application No. EP 21400005. 1, Completed by the European Patent Office, dated Jul. 27, 2021, 9 pages.

*Primary Examiner* — Elim Ortiz
(74) *Attorney, Agent, or Firm* — BROOKS KUSHMAN P.C.

(57) ABSTRACT

An electrically powered rotary-wing aircraft with a first predetermined number of thrust producing units and a second predetermined number of batteries. Each one of the first predetermined number of thrust producing units may include a rotor, and an electrical drive unit with at least two electric motors. Each battery of the second predetermined number of batteries is coupled to at most one electric motor of the at least two electric motors of at least one of the first predetermined number of thrust producing units, and each electric motor of the at least one of the first predetermined number of thrust producing units is coupled to at most one of the second predetermined number of batteries.

20 Claims, 10 Drawing Sheets

(51) Int. Cl.
*B64C 27/22* (2006.01)
*B64C 27/68* (2006.01)

(52) U.S. Cl.
CPC ....... *B60L 2200/10* (2013.01); *B64D 2221/00* (2013.01)

(58) Field of Classification Search
CPC .... H02J 2310/44; H02J 7/0013; H02J 7/0063; B64D 2221/00; B64U 50/19
See application file for complete search history.

(56) References Cited

U.S. PATENT DOCUMENTS

| | | |
|---|---|---|
| 2020/0269975 A1* | 8/2020 | Fink .................... B64C 29/0033 |
| 2020/0283134 A1* | 9/2020 | Mores ..................... B64C 27/10 |
| 2020/0298728 A1* | 9/2020 | Demont ................. B64D 27/24 |

* cited by examiner

ELECTRICALLY POWERED ROTARY-WING AIRCRAFT

CROSS-REFERENCE TO RELATED APPLICATIONS

This application claims priority to European patent application No. EP 21400005.1 filed on Feb. 25, 2021, the disclosure of which is incorporated in its entirety by reference herein.

TECHNICAL FIELD

The present embodiment relates to an electrically powered rotary-wing aircraft, and more particularly to an electrically powered rotary-wing aircraft with a first predetermined number of thrust producing units and a second predetermined number of batteries.

BACKGROUND

Safety is absolutely paramount in air transportation. In fact, air transportation is a field that must typically consider strict applicable regulations, certification requirements, and safety demands independent of a selected air transportation vehicle, such as e.g., helicopters, airplanes, hybrid aircrafts, rockets and so on. Such regulations, certification requirements, and safety demands are e.g., specified by the US-American Federal Aviation Regulations (FAR) from the US-American Federal Aviation Administration (FAA), the European Certification Specifications (CS) from the European Aviation Safety Agency (EASA) and/or other aviation authorities.

Fixed-wing aircrafts and rotary-wing aircrafts address these safety regulations in several different ways. The most common approach for fixed-wing aircrafts involves the use of overpowered jet engines so that the fixed-wing aircraft continues to be operational with the remaining operative jet engines when one jet engine fails.

In contrast thereto, most rotary-wing aircrafts rely on the auto-rotation capability that most rotors provide and the use of two or more engines that are connected to a same rotor, whereby the rotor remains operational when one of the engines fails.

Recently, urban air mobility (UAM) is emerging as a new market with new safety challenges. In particular, most current solutions for urban air mobility (UAM) involve vertical take-off and landing (VTOL) aircrafts with one or more thrust producing units that have an electrical drive unit and are usually equipped with fixed pitch propellers which do not have the auto-rotation capability of other rotary-wing aircrafts. Thus, the aviation manufacturers that produce VTOL aircrafts for the UAM market have to imagine new solutions to provide an extra layer of safety.

The current state of the art at Electrified Vertical Take Off and Landing Vehicle (EVTOL) is that a direct drive electric motor is supplied with energy from batteries via a cable connection. In order to improve safety, the direct drive is connected with two energy sources, respectively batteries, using two cables. The uniform extraction of energy is ensured via diodes, relays, and bus-bars so that the same electric potential is always present on both connections.

Document WO 2019/232472 A1 relates to an electric power system and fault tolerant VTOL aircraft. The power system includes a reliability enhancing battery architecture for electric motors adapted for use in an aerial vehicle. Individual batteries may be used to power a subset of two or more motors in system with six or more motors. Each motor may be powered by two or more subsets of batteries, allowing accommodation for motor failure. With a failed motor in a vertical take-off or landing mode, power may be diverted to other motors to continue proper attitude control, and to provide sufficient thrust. With a failed motor a second motor offset from the failed motor may be powered down to facilitate attitude control.

This electric power system presented in document WO 2019/232472 A1 ensures greater safety in the event of a battery failure. However, if a motor fails, there is no way to continue driving it and as a result all other motors have to compensate this loss. Otherwise, in the event of a battery failure, potential equalization must take place between the motors with only one source and the motors connected in parallel with two sources. However, such an electric power system requires the installation of diodes, relays and bus-bars and thus an increase in weight, cost and maintenance for all the electrical parts.

Many state-of-the-art electric power systems combine individual batteries and distribution of their electrical energy to the installed motors. Thereby, complex energy distribution boxes are needed, to ensure a redundant electrical energy distribution between the batteries in case of a battery failure. The more batteries are used, the more effort is required to connect and integrate them. Every single battery needs a distribution box to distribute and forward its electricity.

SUMMARY

It is, therefore, an objective to provide a new electrically powered rotary-wing aircraft that is suitable to overcome the above-described drawbacks.

The new electrically powered rotary-wing aircraft should further provide a high safety level and ensure the continued supply of electric power to the thrust producing units. In particular, the loss of a battery should not impact the functioning of the thrust producing units.

Moreover, the new electrically powered rotary-wing aircraft should include a simple electric power system (EPS) for providing electricity to the thrust producing units.

The objective is solved by an electrically powered rotary-wing aircraft comprising the features of claim 1. More specifically, according to the present disclosure an electrically powered rotary-wing aircraft comprises a first predetermined number of thrust producing units and a second predetermined number of batteries. Each one of the first predetermined number of thrust producing units comprises a rotor, and an electrical drive unit with at least two electric motors for driving the rotor. The second predetermined number of batteries provides electricity to the at least two electric motors of the first predetermined number of thrust producing units. Each battery of the second predetermined number of batteries is coupled to at most one electric motor of the at least two electric motors of at least one of the first predetermined number of thrust producing units. Each electric motor of the at least one of the first predetermined number of thrust producing units is coupled to at most one of the second predetermined number of batteries.

Thus, the number of batteries is distributed evenly between the electrical drive units in a meaningful and logical manner. More specifically, each electrical drive unit may be provided with two or more motors which are connected to different batteries. This means that each electric motor of each electrical drive unit is assigned to a battery and connected to this battery by a cable, resulting in a simple EPS architecture with a very high level of safety and significant savings in weight, number of parts, cost, and maintenance effort.

The protection of a battery may be secured over an aviation-approved fuse. A battery balancing would be an additional possibility for an active power balancing of the electric motors. Equipotential bonding between the batteries is not required.

More specifically, this EPS architecture was developed to ensure a high level of safety for an electrically powered rotary-wing aircraft, and particularly for the electrical drive unit of such an electrically powered rotary-wing aircraft. The EPS architecture is designed in such a way that an energy supply is always guaranteed, and no electrical drive unit will fail due to energy loss from one battery failure.

Furthermore, the only components required for the architecture may be standard fuses and cables. More generally, fewer electrical components are required for the power distribution between the batteries. Nevertheless, some components such as diodes and relays are subject to a certain amount of wear and tear and have to be replaced on a regular basis. However, the fewer number of required components increases the time intervals between maintenance.

Moreover, contrary to prior art solutions, the present EPS needs no distribution boxes, which are comparatively large and heavy. Thereby, the associated production and installation costs for the EPS may be reduced.

According to one aspect, the first predetermined number is greater than one.

According to one aspect, the second predetermined number is greater than one.

According to one aspect, the at least two electric motors of each one of the first predetermined number of thrust producing units are coupled to different batteries of the second predetermined number of batteries.

According to one aspect, the at least two electric motors of any pair of the first predetermined number of thrust producing units are coupled to a different subset of batteries of the second predetermined number of batteries.

According to one aspect, the electrically powered rotary-wing aircraft further comprises a cable harness that transmits electric power from the second predetermined number of batteries to the at least two electric motors of the first predetermined number of thrust producing units.

According to one aspect, the electrically powered rotary-wing aircraft further comprises fuses in connections between the second predetermined number of batteries and the at least two electric motors of the first predetermined number of thrust producing units.

More specifically, only one fuse may be needed per connection.

According to one aspect, the fuses are adapted to protecting the second predetermined number of batteries from high currents.

More specifically, the batteries may be protected against voltage fluctuations and short-circuits.

According to one aspect, the electrically powered rotary-wing aircraft further comprises an automatic flight control system that controls the first predetermined number of thrust producing units and the second predetermined number of batteries.

According to one aspect, the electrically powered rotary-wing aircraft further comprises a battery control system that is coupled to the automatic flight control system and monitors a status of at least one battery of the second predetermined number of batteries.

According to one aspect, the status comprises at least one of a temperature, a charging level, an outgoing current, a consumption of energy, or a remaining time of operationality of the at least one battery of the second predetermined number of batteries.

According to one aspect, the electrically powered rotary-wing aircraft further comprises a motor control system that is coupled to the automatic flight control system and controls the functions and power needs of the at least two electric motors of the first predetermined number of thrust producing units.

According to one aspect, a first subset of the first predetermined number of thrust producing units is located on a portside and a second subset of the first predetermined number of thrust producing units is located on a starboard side of the electrically powered rotary-wing aircraft. The motor control system further comprises a left motor control system that controls the functions and power needs of the at least two electric motors of the first subset of the first predetermined number of thrust producing units located on the portside of the electrically powered rotary-wing aircraft; and a right motor control system that controls the functions and power needs of the at least two electric motors of the second subset of the first predetermined number of thrust producing units located on the starboard side of the electrically powered rotary-wing aircraft.

According to one aspect, in case of a failure of one of the second predetermined number of batteries, the remaining functioning batteries of the second predetermined number of batteries supply electric power to at least one electric motor of the at least two electric motors in each one of the first predetermined number of thrust producing units in order to enable at least a safe flight of the electrically powered rotary-wing aircraft.

More specifically, the failure of a particular battery may not be a problem, as the remaining batteries continue to supply electric power to the thrust producing units.

According to one aspect, in case of a failure of all but one of the second predetermined number of batteries, such that only a single battery of the second predetermined number of batteries remains functioning, the single battery supplies electric power to at least one electric motor of the at least two electric motors in at least half of the first predetermined number of thrust producing units in order to enable at least a safe emergency landing of the electrically powered rotary-wing aircraft.

More specifically, in an emergency situation, for example in case of the loss of a battery or an electric motor, the automatic flight control system will manage the electric power needs to compensate the drop in performance to the remaining electric motors.

BRIEF DESCRIPTION OF THE DRAWINGS

Preferred embodiments are outlined by way of example in the following description with reference to the attached drawings. In these attached drawings, identical or identically functioning components and elements are labelled with identical reference numbers and characters and are, consequently, only described once in the following description.

DETAILED DESCRIPTION

Figure 1:
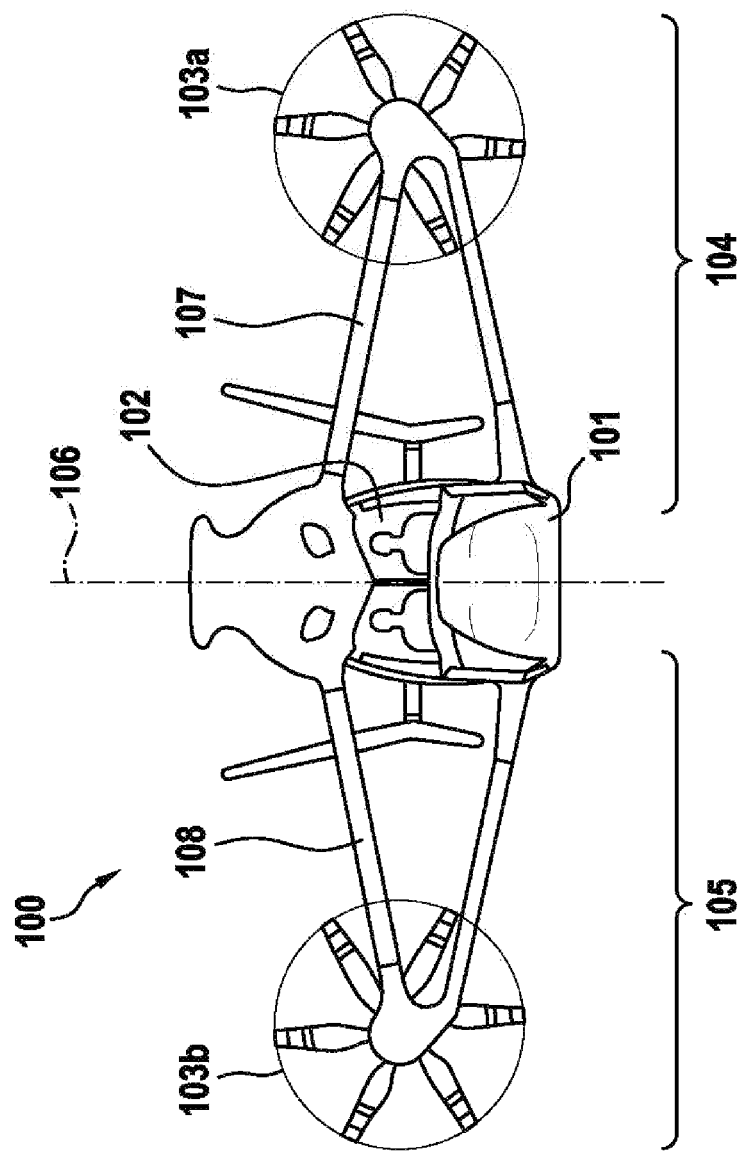
FIG. 1 is a diagram showing a front view of an illustrative electrically powered rotary-wing aircraft with at least two thrust producing units in accordance with some embodiments.
Figure 2:
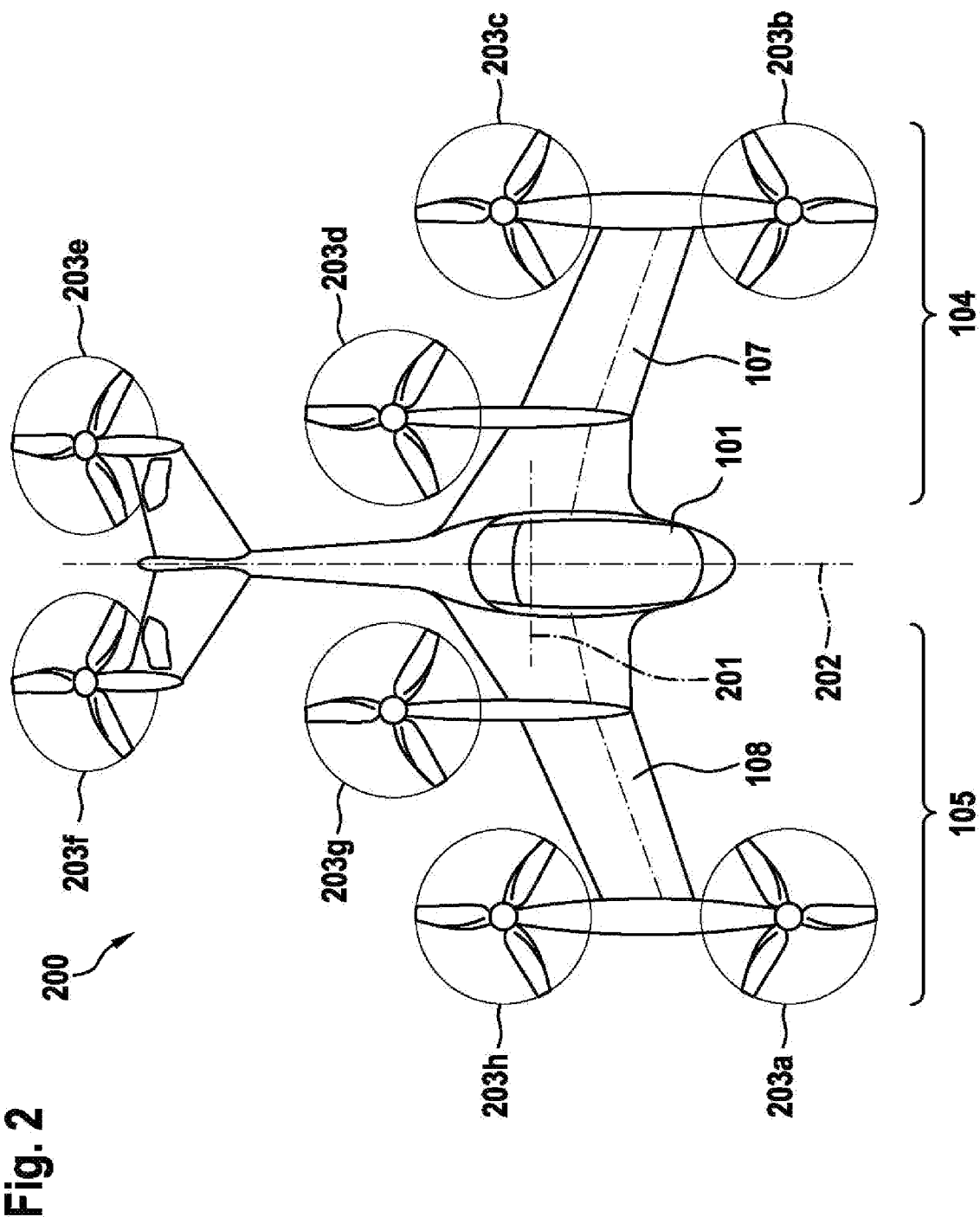
FIG. 2 is a diagram showing a top view of an illustrative electrically powered rotary-wing aircraft with at least eight thrust producing units in accordance with some embodiments.

FIG. 1 shows aircraft 100 and FIG. 2 shows aircraft 200 that are both embodied by an electrically powered rotary-wing aircraft 100, 200. It should be noted that rotary-wing aircraft 100, 200 may be any aircraft with a predetermined number of thrust producing units, whereby each one of the predetermined number of thrust producing units includes a rotor and an electrical drive unit. Exemplary embodiments of rotary-wing aircraft 100, 200 may include airplanes, vertical take-off and landing (VTOL) aircrafts, multicopters, helicopters, drones, etc.

The electrically powered rotary-wing aircraft 100 of FIG. 1 is shown with a vertical axis 106 that corresponds to the yaw axis inherent to the electrically powered rotary-wing aircraft 100. The vertical axis 106 separates the electrically powered rotary-wing aircraft 100 into a portside 104 and a starboard side 105.

Electrically powered rotary-wing aircraft 100 may have an aircraft airframe. The aircraft airframe defines a supporting structure of aircraft 100 that is also referred to hereinafter as the fuselage 101 of the rotary-wing aircraft 100. The fuselage forms an aircraft interior region. The aircraft interior region preferably accommodates at least a cabin 102 for passengers and/or cargo.

Illustratively, the electrically powered rotary-wing aircraft 100 may include at least one upper wing and at least one lower wing. The at least one upper wing may be joined to the at least one lower wing in a joined-wing configuration.

Illustratively, the upper and lower wing form a portside wing 107 assembly and a starboard side wing 108 assembly.

Alternatively, the electrically powered rotary-wing aircraft 100 may comprises a single portside wing 107 and a single starboard side wing 108.

By way of example, the electrically powered rotary-wing aircraft 100 comprises a first predetermined number of thrust producing units 103a, 103b. If desired, the first predetermined number of thrust producing units 103a, 103b is greater than one (e.g., equal to two, three, four, five, six, etc.).

Illustratively, a first thrust producing unit 103a is arranged on the portside 104 of the electrically powered rotary-wing aircraft 100, and a second thrust producing unit 103b is arranged on the starboard side 105 of the electrically powered rotary-wing aircraft 100.

As an example, the first thrust producing unit 103a is mounted on the portside wing 107, and the second thrust producing unit 103b is mounted on the starboard side wing 108.

Illustratively, each one of the first and second thrust producing units 103a, 103b may include a rotor and an electrical drive unit with at least two electric motors for driving the rotor.

By way of example, the electrically powered rotary-wing aircraft 100 may include an electric power system with a predetermined number of batteries for providing electricity to the at least two motors of the first and second thrust producing units 103a, 103b and a cable harness that couples the batteries and the electric motors with each other.

Illustratively, each battery of the predetermined number of batteries may be coupled to at most one electric motor of the at least two electric motors of at least one of the first and second thrust producing units 103a, 103b, and each electric motor of the at least one of the first and second thrust producing units 103a, 103b may be coupled to at most one of the predetermined number of batteries.

As an example, consider the scenario in which the electrically powered rotary-wing aircraft 100 includes batteries X and Y. Consider further that the first thrust producing unit 103a includes an electrical drive unit with electric motors A and B, the second thrust producing unit 103b includes an electrical drive unit with electric motors C and D, that battery X is coupled to motors A and C, and that battery Y is coupled to motors B and D.

In this scenario, if both batteries X and Y are operational, then thrust producing unit 103a remains operational in case of a failure of either one of electric motors A or B, and thrust producing unit 103b remains operational in case of a failure of either one of electric motors C or D.

Furthermore, if all electric motors A, B, C, and D are operational, then thrust producing units 103a and 103b remain operational in case of a failure of either battery X or Y. Moreover, thrust producing unit 103a remains operational in case of a failure of battery X and electric motor A or in case of a failure of battery Y and electric motor B. Similarly, thrust producing unit 103b remains operational in case of a failure of battery X and electric motor C or in case of a failure of battery Y and electric motor D.

FIG. 2 shows a top view of an illustrative electrically powered rotary-wing aircraft 200. The electrically powered rotary-wing aircraft 200 is shown with mutually orthogonal axes 201, 202.

Axis 202 represents a longitudinal axis 202 that corresponds to the roll axis inherent to the electrically powered rotary-wing aircraft 200. The longitudinal axis 202 separates the electrically powered rotary-wing aircraft 200 into a portside 104 and a starboard side 105. Axis 201 represents a lateral axis 201 that corresponds to the pitch axis inherent to the electrically powered rotary-wing aircraft 200.

As shown in FIG. 2, the electrically powered rotary-wing aircraft 200 includes eight thrust producing units 203a, 203b, 203c, 203d, 203e, 203f, 203g, 203h. Thus, the first predetermined number of thrust producing units of the illustrative electrically powered rotary-wing aircraft 200 of FIG. 2 is eight.

As exemplarily illustrated, four thrust producing units 203b, 203c, 203d, 203e are arranged on the portside 104 of the electrically powered rotary-wing aircraft 200, and four thrust producing units 203a, 203f, 203g, 203h are arranged on the starboard side 105 of the electrically powered rotary-wing aircraft 200.

By way of example, three thrust producing units 203b, 203c, 203d are mounted on the portside wing 107, three thrust producing units 203a, 203h, 203g are mounted on the starboard side wing 108, and two thrust producing units 203f, 203e are mounted to a tail boom, that is connected to the fuselage 101 of the electrical rotary-wing aircraft 200.

If desired, the first predetermined number of thrust producing units may be an even number. Illustratively, the arrangement of the thrust producing units 203a to 203h may be symmetrical with respect to a vertical longitudinal median plane defined by the vertical axis (e.g., vertical axis 106 of FIG. 1) and the longitudinal axis 202 of the electrically powered rotary-wing aircraft 200.

Alternatively, the first predetermined number of thrust producing units may be an odd number. If desired, the odd number may be greater than one. Preferably, the arrangement of the thrust producing units between the portside 104 and the starboard side 105 may be symmetrical with respect to a vertical longitudinal median plane defined by the vertical axis (e.g., vertical axis 106 of FIG. 1) and the longitudinal axis 202 of the electrically powered rotary-wing aircraft 200. Thus, at least one thrust producing unit of the thrust producing units may be arranged on the vertical longitudinal median plane defined by the vertical axis and the longitudinal axis 202, while a first half of the remaining thrust producing units is arranged on the starboard side and a second half of the remaining thrust producing units is arranged on the portside of the electrically powered rotary-wing aircraft 200.

Figure 3:
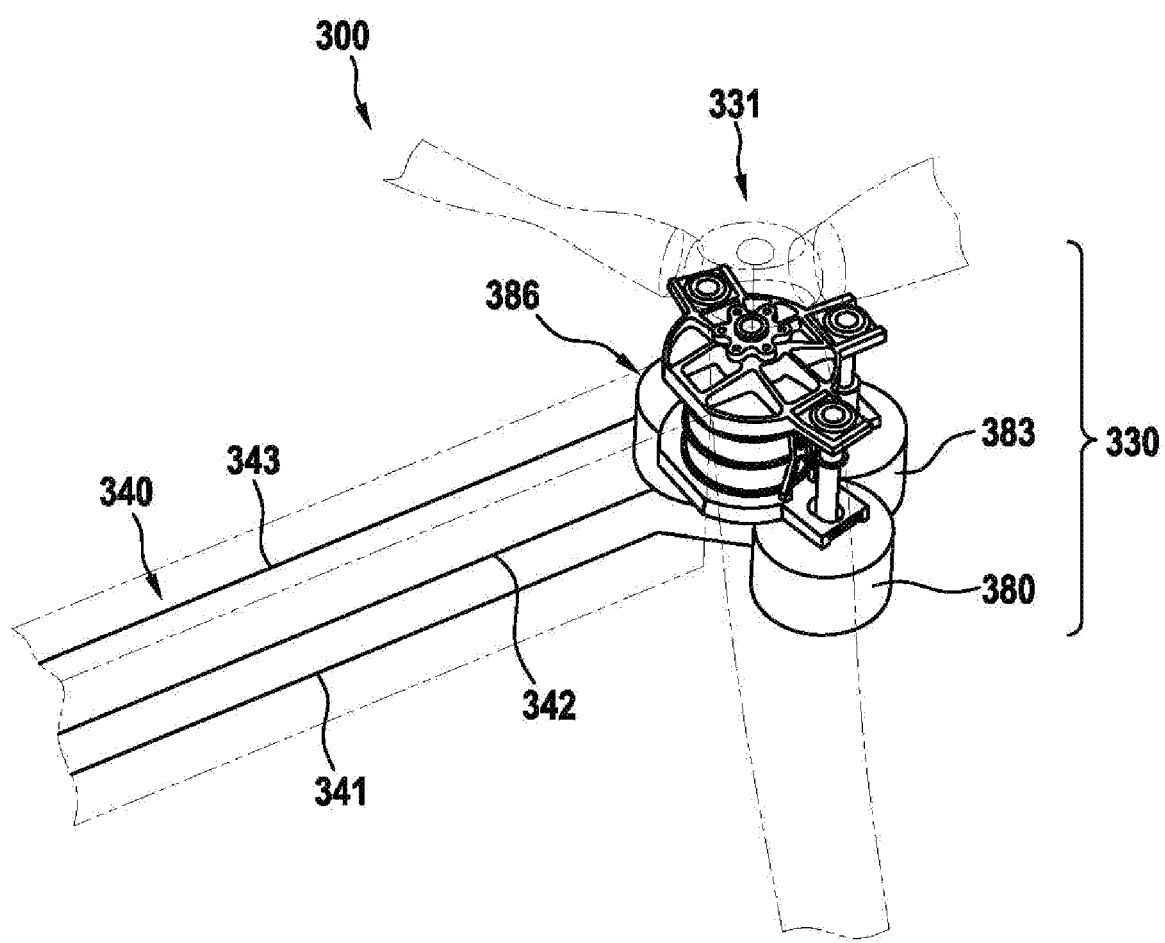
FIG. 3 is a diagram of an illustrative thrust producing unit of the illustrative electrically powered rotary-wing aircraft of FIG. 1 or FIG. 2 with at least two electric motors in accordance with some embodiments.

FIG. 3 shows a diagram of an illustrative thrust producing unit 300 (e.g., one of thrust producing units 103a, 103b of FIG. 1 or one of thrust producing units 203a, 203b, 203c, 203d, 203e, 203f, 203g, 203h of FIG. 2) of an the electrically powered rotary-wing aircraft (e.g., electrically powered rotary-wing aircraft 100 of FIG. 1 or electrically powered rotary-wing aircraft 200 of FIG. 2). Illustratively, the thrust producing unit 300 may include a rotor 331 and an electrical drive unit 330.

As shown in FIG. 3, rotor 331 may include at least two rotor blades. If desired, the number of rotor blades may be more than two. For example, rotor 331 may comprises three, four or more rotor blades.

Illustratively, the electrical drive unit 330 includes at least two electric motors for driving the rotor 331. As shown in FIG. 3, the electrical drive unit 330 may include three electric motors 380, 383, 386. If desired, electrical drive unit 330 may include more than three electric motors.

Electric motors 380, 383, 386 may be any type of electric motor that is adapted for driving rotor 331. Illustratively, electric motors 380, 383, 386 may be alternating current (AC) type motors or direct current (DC) type motors, brushed or brushless, single-phase, two-phase, or three-phase, air-cooled or liquid cooled, or any combination thereof.

Illustratively, the thrust producing unit 300 may include an output shaft. The output shaft may couple the at least two electric motors to the rotor 331. For example, three belts may couple the three electric motors 380, 383, 386 to the output shaft, and the output shaft may be connected to the rotor blades via a rotor hub.

If desired, the thrust producing unit 300 may have at least two electric motors 380, 383 that are arranged at a same distance from the output shaft. Alternatively, thrust producing unit 103a, 103b may have at least two electric motors 380, 383 of which at least one electric motor is arranged at a different distance from an output shaft than the other electric motors.

As an example, the thrust producing unit 103a, 103b may comprise three electric motors 380, 383, 386 that are all arranged at different distances from the output shaft.

As exemplarily illustrated, a cable harness 340 may transmit electric power from the batteries (e.g., batteries 410a, 410b, 610c of FIG. 6) to the at least two electric motors 380, 383, 386. If desired, the cable harness 340 may include wires 341, 342, 343. For example, wires 341 may couple a battery with electric motor 380, wires 342 may couple a battery with electric motor 383, and wires 343 may couple a battery with electric motor 386.

It should be noted that the mechanism of the electrical drive unit is well-known to the person skilled in the art. Thus, a detailed description of such mechanism is omitted, for brevity and conciseness.

FIG. 4 to FIG. 10 show different illustrative electrical drive systems for an electrically powered rotary-wing aircraft (e.g., electrically powered rotary-wing aircraft 100 of FIG. 1 or electrically powered rotary-wing aircraft 200 of FIG. 2).

In particular, FIG. 4 to FIG. 10 show several different electrical drive systems 400, 500, 600, 700, 800, 900, 1000 that each include a first predetermined number of thrust producing units and an electric power system with a second predetermined number of batteries. These electrical drive systems are given by way of example, different configurations of these electrical drive systems may be possible.

Figure 4:
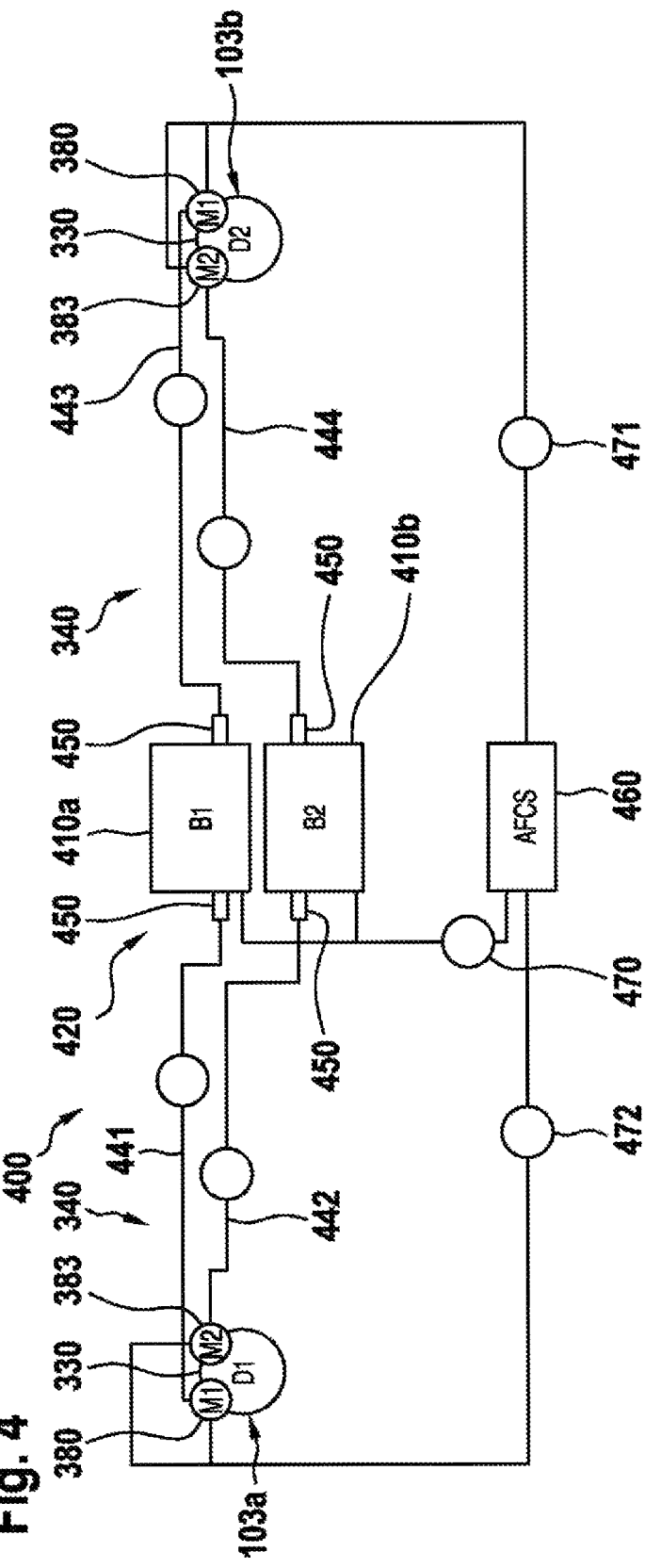
FIG. 4 is a diagram of an illustrative electrical drive system of an electrically powered rotary-wing aircraft with two thrust producing units and two batteries in accordance with some embodiments.

FIG. 4 shows an illustrative electrical drive system 400 for an electrically powered rotary-wing aircraft with a first predetermined number of thrust producing units and an electric power system 420. The electric power system 420 may include a second predetermined number of batteries.

Illustratively, the first predetermined number may be greater than one. If desired, the second predetermined number may be greater than one. As shown in FIG. 4, the first and second predetermined numbers may be equal to two. Thus, the electrically powered rotary-wing aircraft may include two thrust producing units 103a, 103b and an electric power system 420 with two batteries 410a, 410b.

Illustratively, each one of the two thrust producing units 103a, 103b includes a rotor (e.g., rotor 331 of FIG. 3) and an electrical drive unit 330 (e.g., electrical drive unit 330 of FIG. 3). Each electrical drive unit 330 comprises at least two electric motors 380, 383 for driving the rotor. As shown in FIG. 4, the electrical drive unit includes a first electric motor 380 and a second electric motor 383 for driving the rotor.

The two batteries 410a, 410b may provide electric power to the at least two electric motors 380, 383 of the first and the second thrust producing units 103a, 103b.

Illustratively, each battery of the two batteries 410a, 410b is coupled to at most one electric motor of the at least two electric motors 380, 383 of at least one of the two thrust producing units 103a, 103b, and each electric motor 380, 383 of the at least one of the two thrust producing units 103a, 103b is coupled to at most one of the two batteries 410a, 410b.

By way of example, the first battery 410a may be coupled to the first electric motor 380 of the first thrust producing unit 103a and to the first electric motor 380 of the second thrust producing unit 103b.

Illustratively, the second battery 410b may be coupled to the second electric motor 383 of the first thrust producing unit 103a and to the second electric motor 383 of the second thrust producing unit 103b.

Thus, each battery 410a, 410b is coupled to at most one electric motor of the at least two electric motors 380, 383 of the first thrust producing unit 103a, and each battery 410a, 410b is coupled to at most one electric motor of the at least two electric motors 380, 383 of the second thrust producing unit 103b.

As exemplarily illustrated, each electric motor 380, 383, of the first thrust producing unit 103a is coupled to a different battery 410a, 410b, and each electric motor 380, 383 of the second thrust producing unit 103b is coupled to a different battery 410a, 410b. Thus, as shown in FIG. 4, the at least two electric motors 380, 383 of each one of the two thrust producing units 103a, 103b are coupled to different batteries of the two batteries 410a, 410b.

Illustratively, the electric power system 420 may include a cable harness 340. The cable harness 340 may transmit electric power from the two batteries 410a, 410b to the at least two electric motors 380, 383 of the two thrust producing units 103a, 103b.

As shown in FIG. 4, cable harness 340 may include wires 441, 442, 443, 444 for transmitting electric power from the batteries 410a, 410b to the electric motors 380, 383 of thrust producing units 103a, 103b. For example, wires 441 may transmit electric power from the first battery 410a to the first electric motor 380 of the first thrust producing unit 103a, wires 442 may transmit electric power from the second battery 410b to the second electric motor 383 of the first thrust producing unit 103a, wires 443 may transmit electric power from the first battery 410a to the first electric motor 380 of the second thrust producing unit 103b, and wires 444 may transmit electric power from the second battery 410b to the second electric motor 383 of the second thrust producing unit 103b.

By way of example, the electric power system 420 may include fuses 450 in connections between the second predetermined number of batteries 410a, 410b and the at least two electric motors 380, 383 of the first predetermined number of thrust producing units 103a, 103b. The fuses 450 may be adapted to protecting the second predetermined number of batteries 410a, 410b from high currents.

As an example, a first fuse 450 may be coupled with wires 443 between the first battery 410a and the first electric motor 380 of the second thrust producing unit 103b. Similarly, other fuses 450 may be coupled with wires 441, 442, and 444 between the respective battery and the respective electric motor, if desired.

Illustratively, the electrically powered rotary-wing aircraft (e.g., electrically powered rotary-wing aircraft 100 of FIG. 1 or electrically powered rotary-wing aircraft 200 of FIG. 2) may comprise an automatic flight control system 460 that controls the first predetermined number of thrust producing unit 103a, 103b and the second predetermined number of batteries 410a, 410b.

If desired, the electrically powered rotary-wing aircraft may comprise a battery control system 470 that is coupled to the automatic flight control system 460 and monitors a status of at least one battery of the second predetermined number of batteries 410a, 410b. For example, the status may comprise at least one of a temperature, a charging level, an outgoing current, a consumption of energy, or a remaining time of operationality of the at least one battery of the second predetermined number of batteries 410a, 410b.

If desired, a motor control system 471, 472 may be coupled to the automatic flight control system 460. As an example, the motor control system 471, 472 may control the functions and power needs of the at least two electric motors 380, 383.

As shown in FIG. 4, motor control system 471 may control the functions and power needs of the two electric motors 380, 383 of the first thrust producing unit 103a, and motor control system 472 may control the functions and power needs of the two electric motors 380, 383 of the second thrust producing unit 103b.

Exemplarily, a first subset of the first predetermined number of thrust producing units (e.g., first thrust producing unit 103a) is located on a portside (e.g., portside 104 of FIG. 1) and a second subset of the first predetermined number of thrust producing units (e.g., second thrust producing unit 103b) is located on a starboard side (e.g., starboard side 105 of FIG. 1) of the electrically powered rotary-wing aircraft.

The motor control system 471, 472 may further comprise a right motor control system 471, and a left motor control system 472. The left motor control system 472 may control the functions and power needs of the at least two electric motors 380, 383 of the first subset of the first predetermined number of thrust producing units 103a located on the portside (e.g., portside 104 of FIG. 1) and the right motor control system 471 may control the functions and power needs of the at least two electric motors 380, 383 of the second subset of the first predetermined number of thrust producing units 103b located on the starboard side (e.g., starboard side 105 of FIG. 1) of the electrically powered rotary-wing aircraft.

By way of example, in case of a failure of the first battery 410a, the remaining functioning battery 410b may provide sufficient electric power for a safe emergency landing of the electrically powered rotary-wing aircraft.

Similarly, in case of a failure of, for example, the second battery 410b, the remaining functioning battery 410a may provide sufficient electric power for a safe emergency landing of the electrically powered rotary-wing aircraft 100.

Figure 5:
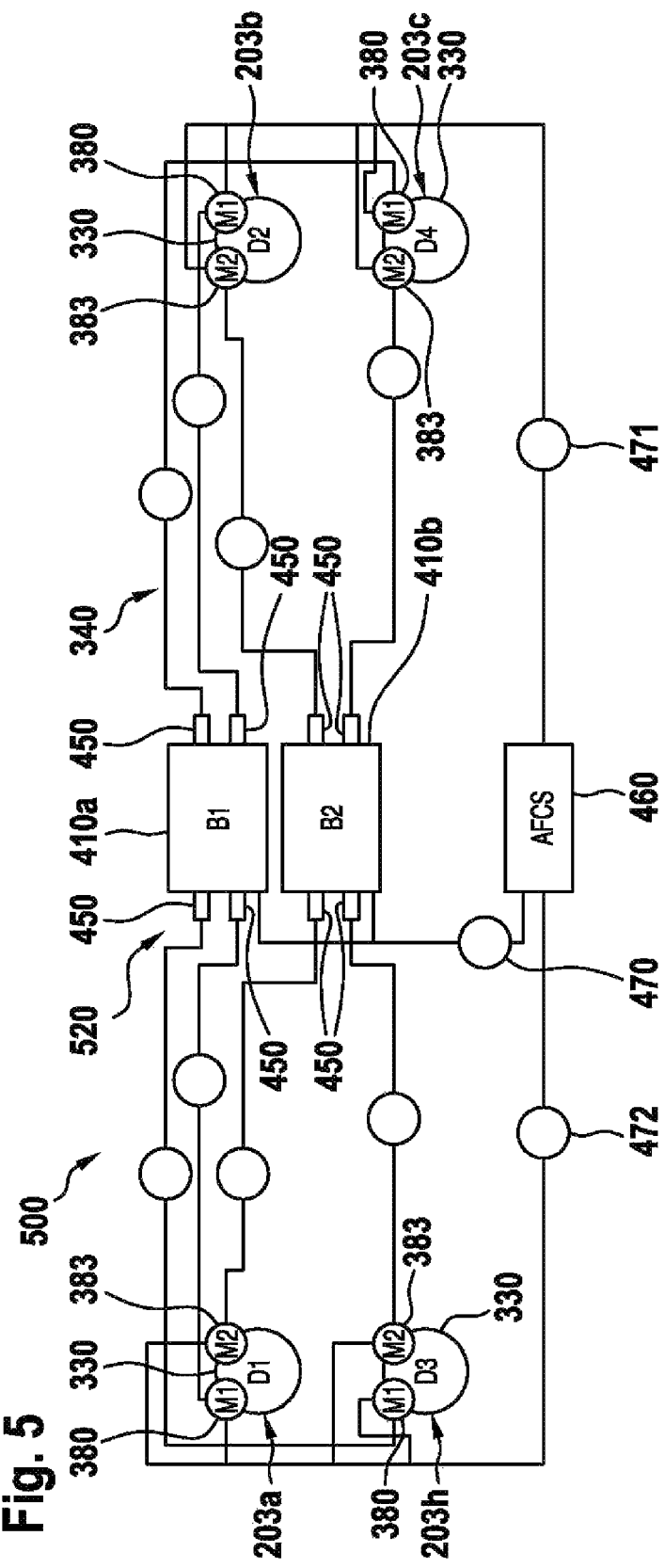
FIG. 5 is a diagram of an illustrative electrical drive system of an electrically powered rotary-wing aircraft with four thrust producing units and two batteries in accordance with some embodiments.

FIG. 5 shows an illustrative electrical drive system 500 for an electrically powered rotary-wing aircraft (e.g., electrically powered rotary-wing aircraft 100 of FIG. 1 or electrically powered rotary-wing aircraft 200 of FIG. 2) with four thrust producing units 203a, 203b, 203h, 203c and an electric power system 520. The electric power system 520 may include two batteries 410a, 410b.

In contrast to the electrical drive system 400 of FIG. 4, the electrical drive system 500 comprises, in addition to the first and second thrust producing units 203a, 203b third and fourth thrust producing units 203h, 203c. In other words, the electrically powered rotary-wing aircraft comprises two pairs of thrust producing units 203a, 203b, 203h, 203c.

Illustratively, the first and third thrust producing units 203a, 203h may be arranged on the portside (e.g., portside 104 of FIG. 1) of the electrically powered rotary-wing aircraft, and the second and fourth thrust producing units 203b, 203c may be arranged on the starboard side (e.g., starboard side 105 of FIG. 1) of the electrically powered rotary-wing aircraft.

All the thrust producing units comprise an electrical drive unit 330, comprising at least two motors 380, 383. As shown in FIG. 5, each thrust producing unit of the four thrust producing units 203a, 203b, 203h, 203c include first and second electric motors 380, 383.

Illustratively, the first battery 410a may be coupled:
to the first electric motor 380 of the first thrust producing unit 203a,
to the first electric motor 380 of the third thrust producing unit 203h,
to the first electric motor 380 of the second thrust producing unit 203b, and
to the first electric motor 380 of the fourth thrust producing unit 203c.

The second battery 410b may be coupled:
to the second electric motor 383 of the first thrust producing unit 203a,
to the second electric motor 383 of the third thrust producing unit 203h,
to the second electric motor 383 of the second thrust producing unit 203b, and
to the second electric motor 383 of the fourth thrust producing unit 203c.

Thus, each battery of batteries 410a, 410b is coupled to four electric motors 380, 383 instead of being coupled to two electric motors as shown in FIG. 4. However, each battery of batteries 410a, 410b is coupled to at most one electric motor 380, 383 in any thrust producing unit of thrust producing units 203a, 203b, 203h, 203c. Moreover, each electric motor 380, 383 of all thrust producing units 203a, 203b, 203h, 203c is connected to at most one of the two batteries 410a, 410b.

In other words, no electric motor 380, 383 is coupled to more than one battery, and no battery 410a, 410b is coupled to more than one electric motor 380, 383 in any one of the thrust producing units 203a, 203b, 203h, 203c.

Thus, in the scenario in which the first battery 410a fails, the first electric motor 380 of all thrust producing units 203a, 203b, 203h, 203c ceases functioning, while the second battery 410b continues to provide power to the second electric motor 383 of thrust producing units 203a, 203b, 203h, 203c. In this scenario, the second battery 410b may provide sufficient electric power to the second electric motors 383 of the thrust producing units 203a, 203b, 203h, 203c to enable a safe emergency landing of the electrically powered rotary-wing aircraft.

Similarly, in the scenario in which the second battery 410b fails, the second electric motor 383 of all thrust producing units 203a, 203b, 203h, 203c ceases functioning, while the first battery 410a continues to provide power to the first electric motor 380 of thrust producing units 203a, 203b, 203h, 203c. In this scenario, the first battery 410a may provide sufficient electric power to the first electric motors 380 of the thrust producing units 203a, 203b, 203h, 203c to enable a safe emergency landing of the electrically powered rotary-wing aircraft.

Figure 6:
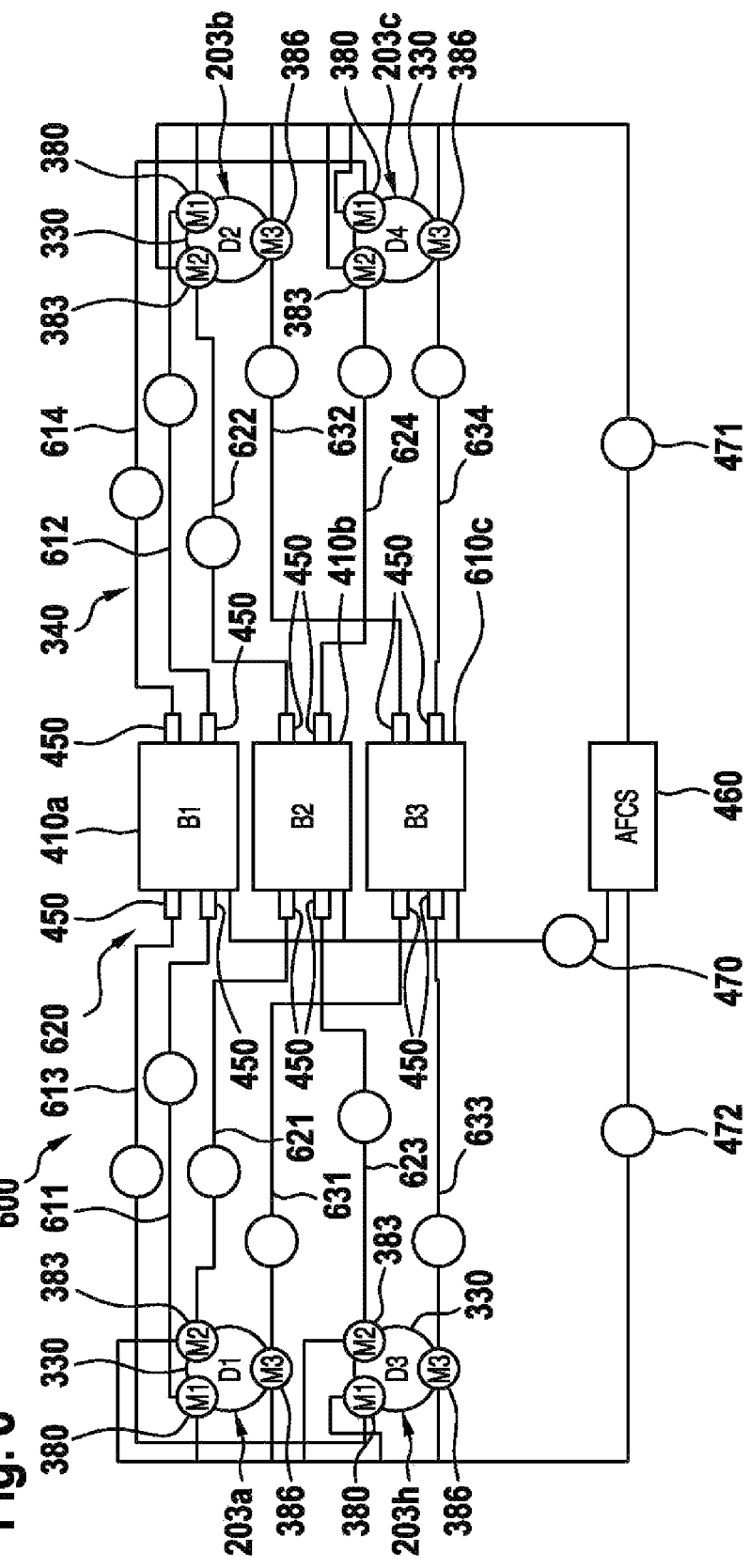
FIG. 6 is a diagram of an illustrative electrical drive system of an electrically powered rotary-wing aircraft with four thrust producing units and three batteries in accordance with some embodiments.

FIG. 6 shows an illustrative electrical drive system 600 for an electrically powered rotary-wing aircraft (e.g., electrically powered rotary-wing aircraft 100 of FIG. 1 or electrically powered rotary-wing aircraft 200 of FIG. 2) with four thrust producing units 203a, 203b, 203h, 203c and an electric power system 620. The electric power system 620 may include three batteries 410a, 410b, 610c.

In contrast to the electrical drive system 500 of FIG. 5, the electrical drive system 600 of FIG. 6 comprises, in addition to the first and second batteries 410a, 410b a third battery 610c. Moreover, the thrust producing units 203a, 203b, 203h, 203c each include an electrical drive unit 330 that has, in addition to the two electric motors 380, 383, at least one additional electric motor 386.

By way of example, the electric power system 620 may include fuses 450 in connections between the batteries 410a, 410b, 610c and the electric motors 380, 383, 386 of the four thrust producing units 203a, 203b, 203h, 203c. The fuses 450 may be adapted to protecting the batteries 410a, 410b, 610c from high currents.

Illustratively, the electric power system 620 may include a cable harness 340. The cable harness 340 may transmit electric power from the three batteries 410a, 410b, 610c to the electric motors 380, 383, 386 of the four thrust producing units 203a, 203b, 203h, 203c.

As shown in FIG. 6, cable harness 340 may include wires 611, 612, 613, 614, 621, 622, 623, 624, 631, 632, 633, 634 for supplying electric power from the batteries 410a, 410b, 610c to the electric motors 380, 383, 386 of thrust producing units 203a, 203b, 203h, 203c.

Illustratively, the first battery 410a is coupled:
via fuses 450 and wires 611 to the first electric motor 380 of the first thrust producing unit 203a,
via fuses 450 and wires 612 to the first electric motor 380 of the third thrust producing unit 203h,
via fuses 450 and wires 613 to the first electric motor 380 of the second thrust producing unit 203b, and
via fuses 450 and wires 614 to the first electric motor 380 of the fourth thrust producing unit 203c.

Illustratively, the second battery 410b is coupled:
via fuses 450 and wires 621 to the second electric motor 383 of the first thrust producing unit 203a,
via fuses 450 and wires 622 to the second electric motor 383 of the third thrust producing unit 203h,
via fuses 450 and wires 623 to the second electric motor 383 of the second thrust producing unit 203b, and
via fuses 450 and wires 624 to the second electric motor 383 of the fourth thrust producing unit 203c.

Illustratively, the third battery 610c is coupled:
via fuses 450 and wires 631 to the third electric motor 386 of the first thrust producing unit 203a,
via fuses 450 and wires 632 to the third electric motor 386 of the third thrust producing unit 203h,
via fuses 450 and wires 633 to the third electric motor 386 of the second thrust producing unit 203b, and
via fuses 450 and wires 634 to the third electric motor 386 of the fourth thrust producing unit 203c.

As exemplarily illustrated, the first, second, and third electric motors 380, 383, 386 of each one of the first, second, third, and fourth thrust producing units 203a, 203b, 2033h, 203c are coupled to different batteries 410a, 410b, 610c.

An electrically powered rotary-wing aircraft with an electrical drive system 600 as shown in FIG. 6 that includes four thrust producing units 203a, 203b, 203h, 203c and three batteries 410a, 410b, 610c may provide a high safety level. As an example, the loss of one electric motor of the electric motors 380, 383, 386 in any one thrust producing unit may not be catastrophic as the remaining two operational electric motors of the electric motors 380, 383, 386 of the affected thrust producing unit continue to provide the required redundancy for operating the thrust producing unit.

As another example, in case of a failure of one of the first, second, or third battery 410a, 410b, 610c, the remaining functioning batteries of the three batteries 410a, 410b, 610c may supply electric power to at least one electric motor of the at least two electric motors 380, 383 in each one of the first predetermined number of thrust producing units 203a, 203b, 203h, 203c in order to enable at least a safe flight of the electrically powered rotary-wing aircraft. As shown in FIG. 6, the two remaining functioning batteries of the three batteries 410a, 410b, 610c may continue to provide power to two electric motors of the electric motors 380, 383, 386 in each thrust producing unit of thrust producing units 203a, 203b, 203h, 203c.

As yet another example, in case of a failure of all but one of the first, second, and third batteries 410a, 410b, 610c such that only a single battery of the three batteries 410a, 410b, 610c remains functioning, the single battery supplies electric power to at least one electric motor of the three electric motors 380, 383, 386 in each one of the first predetermined number of thrust producing units 203a, 203b, 203c, 203d, 203e, 203f, 203g, 203h in order to enable at least a safe emergency landing of the electrically powered rotary-wing aircraft.

Figure 7:
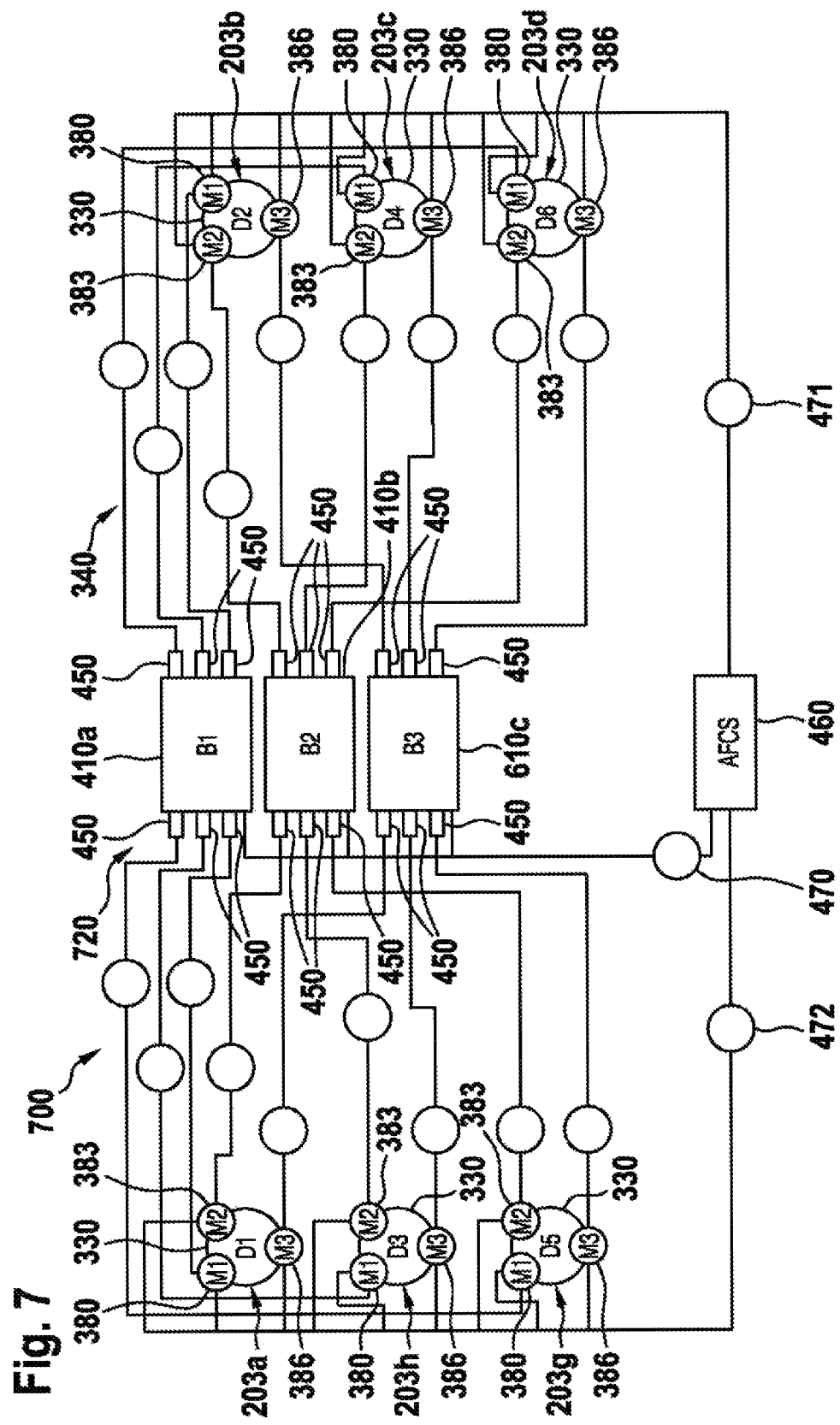
FIG. 7 is a diagram of an illustrative electrical drive system of an electrically powered rotary-wing aircraft with six thrust producing units and three batteries in accordance with some embodiments.

FIG. 7 shows an illustrative electrical drive system 700 for an electrically powered rotary-wing aircraft (e.g., electrically powered rotary-wing aircraft 100 of FIG. 1 or electrically powered rotary-wing aircraft 200 of FIG. 2) with six thrust producing units 203a, 203b, 203h, 203c, 203g, 203d and an electric power system 720. The electric power system 720 may include three batteries 410a, 410b, 610c.

In contrast to the electrical drive system 600 of FIG. 6, the electrical drive system 700 of FIG. 7 comprises, in addition to the first, second, third, and fourth thrust producing units 203a, 203b, 203h, 203c a fifth and a sixth thrust producing unit 203g, 203d. Each one of the six thrust producing units 203a, 203b, 203h, 203c, 203g, 203d, may include a rotor and an electrical drive unit 330 with three electric motors 380, 383, 386.

By way of example, each battery 410a, 410b, 610c is coupled to six different electric motors 380, 383, 386.

Illustratively, in addition to the coupling described in FIG. 6:
the first battery 410a is coupled to the first electric motor 380 of the fifth thrust producing unit 203g,
the first battery 410a is coupled to the first electric motor 380 of the sixth thrust producing unit 203d,
the second battery 410b is coupled to the second electric motor 383 of the fifth thrust producing unit 203g,
the second battery 410b is coupled to the second electric motor 383 of the sixth thrust producing unit 203d,
the third battery 610c is coupled to the third electric motor 386 of the fifth thrust producing unit 203g, and
the third battery 610c is coupled to the third electric motor 386 of the sixth thrust producing unit 203d.

Figure 8:
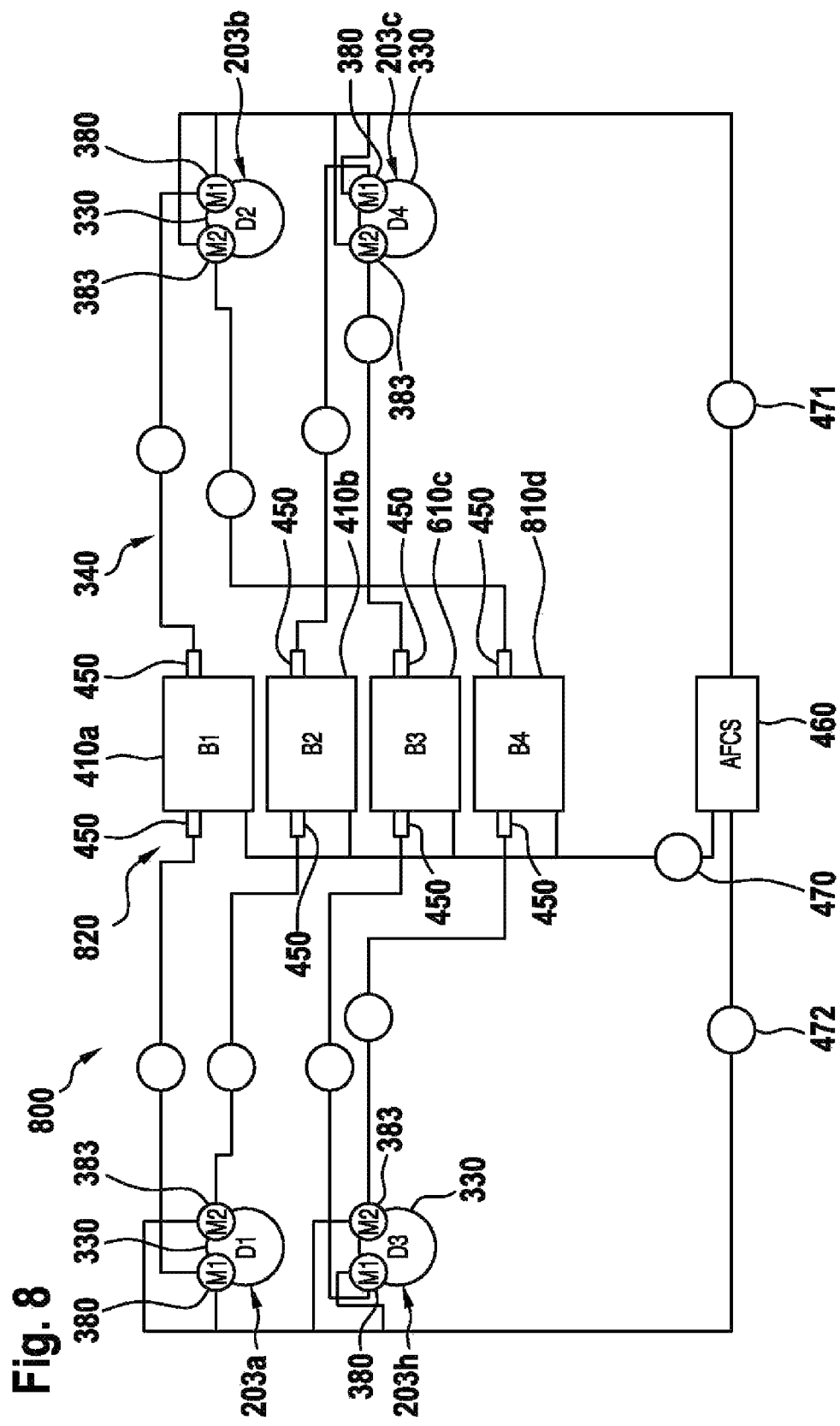
FIG. 8 is a diagram of an illustrative electrical drive system of an electrically powered rotary-wing aircraft with four thrust producing units and four batteries in accordance with some embodiments.

FIG. 8 shows an illustrative electrical drive system 800 for an electrically powered rotary-wing aircraft (e.g., electrically powered rotary-wing aircraft 100 of FIG. 1 or electrically powered rotary-wing aircraft 200 of FIG. 2) with four thrust producing units 203a, 203b, 203h, 203c, each having an electrical drive unit 330 with two electric motors 380, 383, and an electric power system 820. The electric power system 820 may include four batteries 410a, 410b, 610c, 810d.

In contrast to the electrical drive system 500 of FIG. 5, the electrical drive system 800 of FIG. 8 comprises, in addition to first and second batteries 410a, 410b, at least two additional batteries 610c, 810d.

By way of example, each battery of first, second, third, and fourth batteries 410a, 410b, 610c, 810d is coupled to two electric motors 380, 383 that are located in two different thrust producing units.

Illustratively, the first battery 410a is coupled:
to the first electric motor 380 of the first thrust producing unit 203a, and
to the first electric motor 380 of the second thrust producing unit 203b.

Illustratively, the second battery 410b, is coupled:
to the second motor 383 of the first thrust producing unit 203a, and
to the first electric motor 380 of the fourth thrust producing unit 203c.

Illustratively, the third battery 610c is coupled:
to the first electric motor 380 of the third thrust producing unit 203h, and
to the second electric motor 383 of the third thrust producing unit 203c.

Illustratively, the fourth battery 810d is coupled:
to the second electric motor 383 of the third thrust producing unit 203h, and
to the second electric motor 383 of the second thrust producing unit 203b.

Thus, the two electric motors 380, 383 of the first thrust producing unit 203a are coupled to the first and second batteries 410a, 410b, the two electric motors 380, 383 of the second thrust producing unit 203b are coupled to the first and fourth batteries 410a, 810d, the two electric motors 380, 383 of the third thrust producing unit 203h are coupled to the third and fourth batteries 610c, 810d, and the two electric motors 380, 383 of the fourth thrust producing unit 203c are coupled to the second and third batteries 410b, 610c. In other words, the two electric motors 380, 383 of any pair of the four thrust producing units 203a, 203b, 203h, 203c are coupled to a different subset of batteries of the four batteries 410a, 410b, 610c, 810d.

In case of a failure of one of the four batteries 410a, 410b, 610c, 810d, the remaining functioning batteries of the four batteries 410a, 410b, 610c, 810d may supply electric power to at least one electric motor of the at least two electric motors 380, 383 in each one of the first predetermined number of thrust producing units 203a, 203b, 203h, 203c in order to enable at least a safe flight of the electrically powered rotary-wing aircraft. For example, in case of a failure of the first battery 410a, first electric motors 380 of the first and second thrust producing units 203a, 203b cease functioning, while the second electric motors 383 of the first and second thrust producing units 203a, 203b and both electric motors 380, 383 of the third and fourth thrust producing units 203h, 203c may continue to receive electric power from the remaining functioning batteries 410b, 610c, 810d.

Moreover, even in case of a failure of half of the second predetermined number of batteries (i.e., two of the four batteries) 410a, 410b, 610c, 810d, the remaining functioning batteries of the four batteries 410a, 410b, 610c, 810d may supply electric power to at least one electric motor of the at least two electric motors 380, 383 in at least three quarters of the first predetermined number of thrust producing units (i.e., three of the four thrust producing units) 203a, 203b, 203h, 203c. In some scenarios, a safe flight of the electrically powered rotary-wing aircraft may be ensured with three quarters of the thrust producing units.

For example, in case of a failure of the first and second batteries 410a, 410b, both electric motors 380, 383 of the first thrust producing unit 203a may cease functioning, and the first electric motors 380 of the second and fourth thrust producing units 203b, 203c may cease functioning, while the second electric motor 383 of the second and fourth thrust producing units 203b, 203c and both electric motors 380, 383 of the third thrust producing unit 203h may continue to receive electric power from the remaining two functioning batteries 610c, 810d.

Illustratively, in case of a failure of all but one of the four batteries 410a, 410b, 610c, 810d, such that only a single battery of the four batteries 410a, 410b, 610c, 810d remains functioning, the single battery supplies electric power to at least one electric motor of the two electric motors 380, 383 in two of the four thrust producing units 203a, 203b, 203h, 203c in order to enable at least a safe emergency landing of the electrically powered rotary-wing aircraft.

For example, in case of a failure of the first, second, and third batteries 410a, 410b, 610c, both electric motors 380, 383 of the first and fourth thrust producing units 203a, 203c may cease functioning, and the first electric motors 380 of the second and fourth thrust producing units 203b, 203c may cease functioning, while the second electric motors 383 of the second and fourth thrust producing units 203b, 203c and both electric motors 380, 383 of the third thrust producing unit 203h may continue to receive electric power from the remaining two functioning batteries 610c, 810d.

Figure 9:
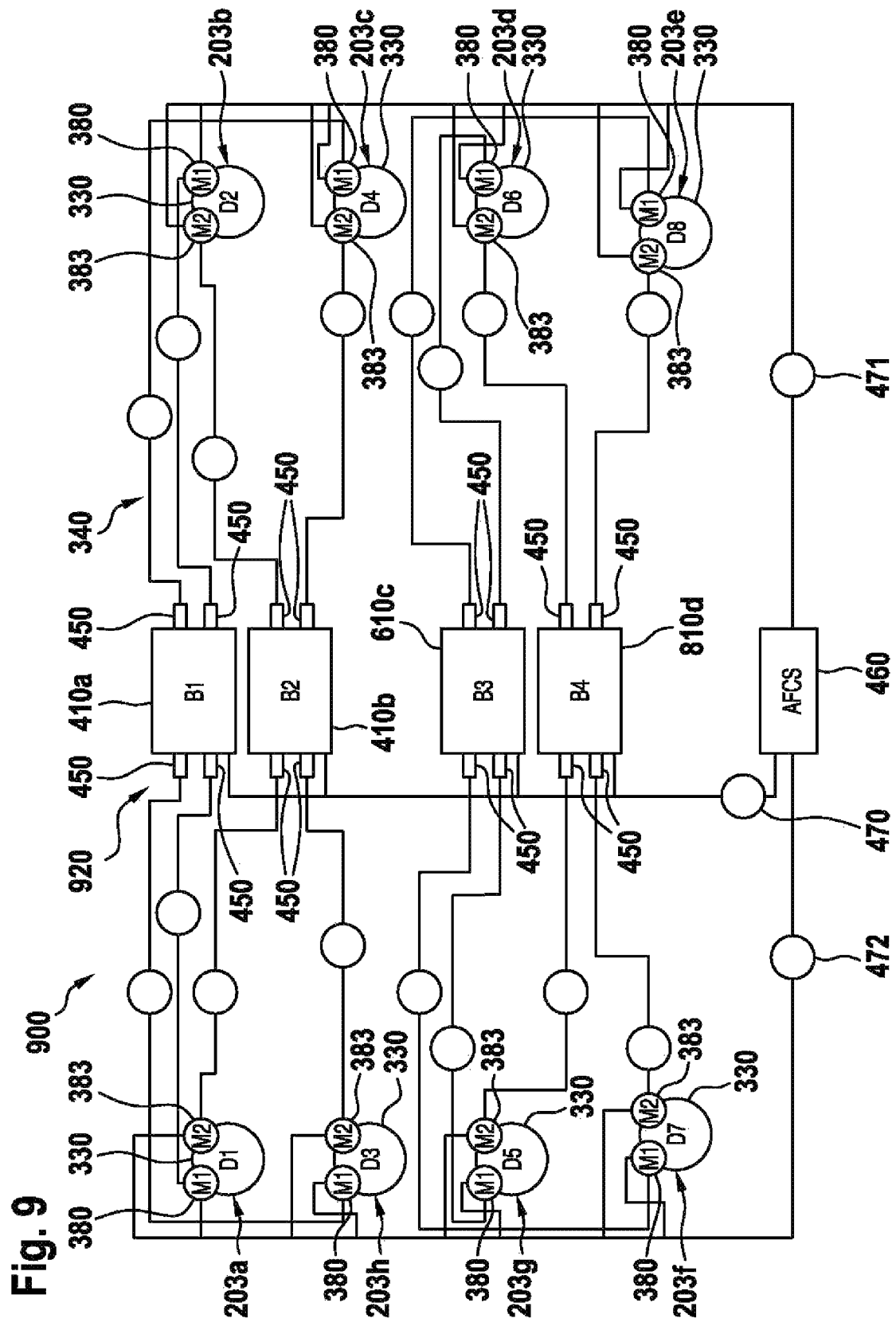
FIG. 9 is a diagram of an illustrative electrical drive system of an electrically powered rotary-wing aircraft with eight thrust producing units and four batteries in accordance with some embodiments.

FIG. 9 shows an illustrative electrical drive system 900 for the electrically powered rotary-wing aircraft 200 of FIG. 2 with eight thrust producing units and four batteries.

In contrast to the electrical drive system 800 of FIG. 8, the electrical drive system 900 comprises, in addition to the first, second, third, and fourth thrust producing units 203a, 203b, 203h, 203c, four additional thrust producing units 203g, 203d, 203f, 203e. Each one of the eight thrust producing units 203a, 203b, 203h, 203c, 203g, 203d, 203f, 203e may include a rotor (e.g., rotor 331 of FIG. 3) and an electrical drive unit 330. Each electrical drive unit 330 may include two electric motors 380, 383.

The electrical drive system 900 may include a cable harness 340 that transmits power from the four batteries 410a, 410b, 610c, 810d to the eight thrust producing units 203a, 203b, 203h, 203c, 203g, 203d, 203f, 203e.

Illustratively, the portion of the cable harness 340 that couples first and second batteries 410a, 410b with first, second, third, and fourth thrust producing units 203a, 203b, 203h, 203c may be similar to the coupling of the first and second batteries 410a, 410b with first, second, third, and fourth thrust producing units 203a, 203b, 203h, 203c described with reference to electrical drive system 500 of FIG. 5. In particular, the first battery 410a may be coupled to the first electric motors 380 of the first, second, third, and fourth thrust producing unit 203a, 203b, 203h, 203c, and the second battery 410b may be coupled to the second electric motors 383 of the first, second, third, and fourth thrust producing unit 203a, 203b, 203h, 203c.

By way of example, the portion of the cable harness 340 that couples the third and fourth batteries 610c, 810d with fifth, sixth, seventh, and eighth thrust producing units 203g, 203d, 203f, 203e is similar to the couplings described with reference to the first and second batteries 410a, 410b with first, second, third, and fourth thrust producing units 203a, 203b, 203h, 203c. As shown in FIG. 9, the third battery 610c may be coupled to the first electric motors 380 of the fifth, sixth, seventh, and eighth thrust producing unit 203g, 203d, 203f, 203e, and the second battery 410b may be coupled to the second electric motors 383 of the fifth, sixth, seventh, and eighth thrust producing unit 203g, 203d, 203f, 203e.

Figure 10:
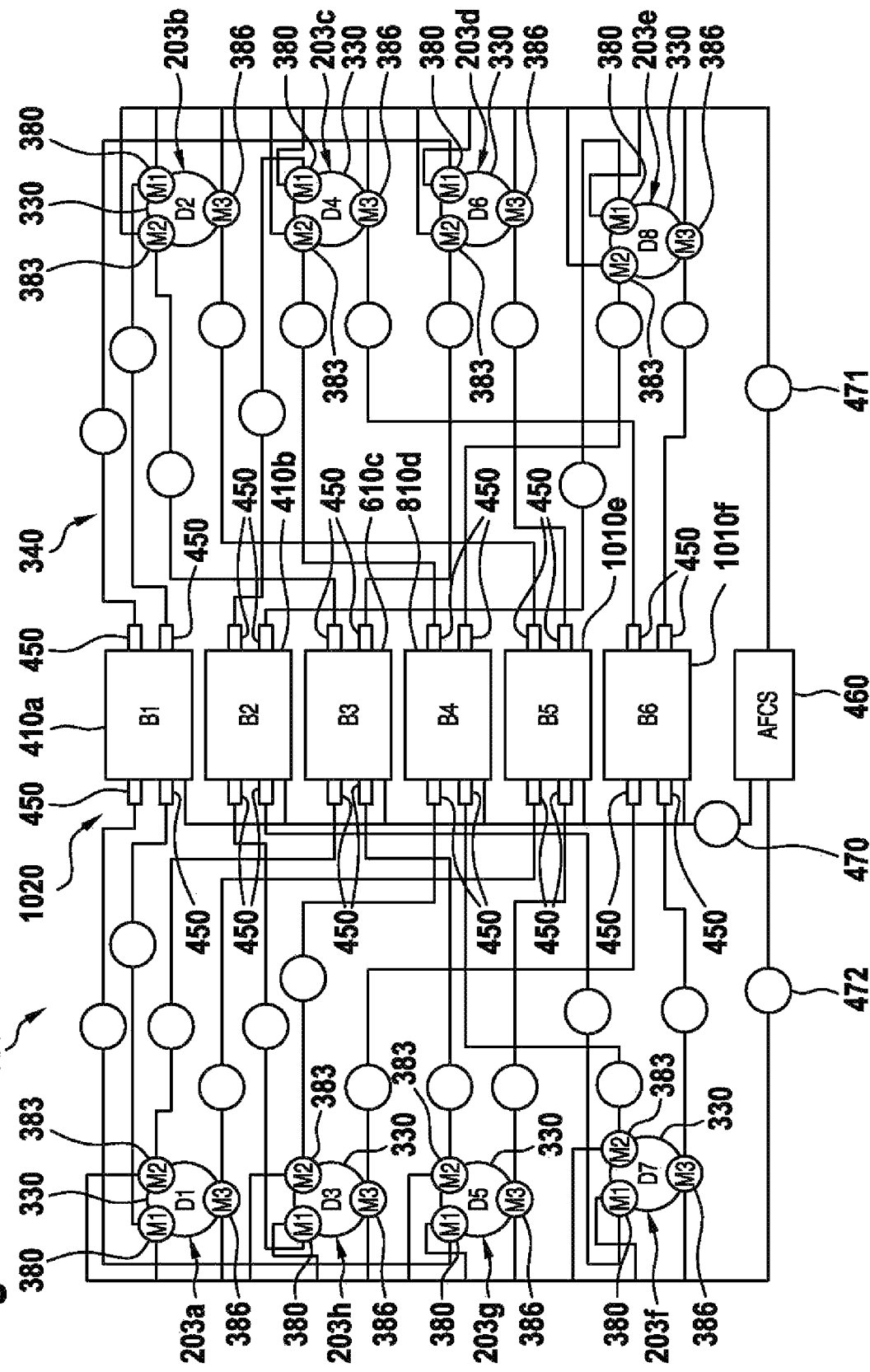
FIG. 10 is a diagram of an illustrative electrical drive system of an electrically powered rotary-wing aircraft with eight thrust producing units and six batteries in accordance with some embodiments.

FIG. 10 shows an illustrative electrical drive system 1000 for the electrically powered rotary-wing aircraft 200 of FIG. 2, with a first predetermined number of eight thrust producing units 203a, 203b, 203h, 203c, 203g, 203f, 203d, 203e and a second predetermined number of six batteries 410a, 410b 610c, 810d, 1010e, 1010f.

Each thrust producing unit of the eight thrust producing units 203a, 203b, 203h, 203c, 203g, 203f, 203d, 203e comprises a rotor and an electrical drive unit 330 with at least two electric motors. As shown in FIG. 10, each electrical drive unit 330 includes three electric motors 380, 383, 386.

The second predetermined number of six batteries 410a, 410b 610c, 810d, 1010e, 1010f may provide electricity to the at least two electric motors 380, 383, 386 of the first predetermined number of eight thrust producing units 203a, 203b, 203h, 203c, 203g, 203f, 203d, 203e.

Illustratively, each battery of the second predetermined number of batteries 410a, 410b, 610c, 810d, 1010e, 1010f is coupled to at most one electric motor of the at least two electric motors 380, 383, 386 of at least one of the first predetermined number of thrust producing units 203a, 203b, 203h, 203c, 203g, 203f, 203d, 203e. Thus, the three electric motors 380, 383, 386 of at least one thrust producing unit are coupled to different batteries. As shown in FIG. 10, no battery of batteries 410a, 410b, 610c, 810d, 1010e, 1010f is coupled to more than one electric motor in any one of thrust producing units 203a, 203b, 203h, 203c, 203g, 203f, 203d, 203e.

By way of example, each electric motor 380, 383, 386 of the at least one of the eight thrust producing units 203a, 203b, 203h, 203c, 203g, 203f, 203d, 203e is coupled to at most one of the six of batteries 410a, 410b, 610c, 810d, 1010e, 1010f. As shown in FIG. 10, no electric motor 380, 383, 386 is coupled to more than one battery.

As shown in FIG. 10, in a first configuration, the electric motors 380, 383, 386 of the first, second, and fifth thrust producing units 203a, 203b, 203g are coupled to the first, third, and fifth batteries 410a, 610c, 1010e, respectively, the electric motors 380, 383, 386 of the third, fourth, and seventh thrust producing units 203h, 203c, 203f are coupled to the second, fourth, and sixth batteries 410b, 810d, 1010f, respectively, the electric motors 380, 383, 386 of the sixth thrust producing unit 203d are coupled to the first, fourth, and fifth batteries 410a, 810d, 1010e, respectively, and the electric motors 380, 383, 386 of the eighth thrust producing unit 203e are coupled to the second, third, and sixth batteries 410b, 610c, 1010f, respectively.

Thus, the electric motors 380, 383, 386 of the first, second, and fifth thrust producing units 203a, 203b, 203g are coupled to a same subset of batteries (i.e., to first, third, and fifth battery), and the electric motors 380, 383, 386 of the third, fourth, and seventh thrust producing units 203h, 203c, 203f are coupled to a same subset of batteries (i.e., to second, fourth, and sixth battery). If desired, the three electric motors of any pair of the eight thrust producing units 203a, 203b, 203h, 203c, 203g, 203f, 203d, 203e may be coupled to a different subset of batteries of the six batteries 410a, 410b, 610c, 810d, 1010e, 1010f.

For example, in a second configuration, the electric motors 380, 383, 386 of the first thrust producing unit 203a may be coupled to the first, third, and fifth batteries 410a, 610c, 1010e, respectively, the electric motors 380, 383, 386 of the second thrust producing unit 203b may be coupled to the first, fourth, and fifth batteries 410a, 810d, 1010e, respectively, the electric motors 380, 383, 386 of the third thrust producing unit 203h may be coupled to the first, third, and sixth batteries 410a, 610c, 1010f, respectively, the electric motors 380, 383, 386 of the fourth thrust producing unit 203c may be coupled to the first, fourth, and sixth batteries 410a, 810d, 1010f, respectively, the electric motors 380, 383, 386 of the fifth thrust producing unit 203g may be coupled to the second, third, and fifth batteries 410b, 610c, 1010e, respectively, the electric motors 380, 383, 386 of the sixth thrust producing unit 203d may be coupled to the second, fourth, and fifth batteries 410b, 810d, 1010e, respectively, the electric motors 380, 383, 386 of the seventh thrust producing unit 203f may be coupled to the second, third, and sixth batteries 410b, 610c, 1010f, respectively, and the electric motors 380, 383, 386 of the eighth thrust producing unit 203e may be coupled to the second, fourth, and sixth batteries 410b, 810d, 1010f, respectively.

In both, the first and second configurations, the three electric motors 380, 383, 386 of each one of the eight thrust producing units 203a, 203b, 203h, 203c, 203g, 203d, 203f, 203e is coupled to different batteries of the six batteries 410a, 410b, 610c, 810d, 1010e, 1010f.

As shown in FIG. 10, a cable harness 340 may transmit the electric power from the six batteries 410a, 410b, 610c, 810d, 1010e, 1010f to the three electric motors 380, 383, 386 of the eight thrust producing units 203a, 203b, 203h, 203c, 203g, 203d, 203f, 203e.

Illustratively, the connections between the six batteries 410a, 410b, 610c, 810d, 1010e, 1010f and the three electric motors 380, 383, 386 of the eight thrust producing units 203a, 203b, 203h, 203c, 203g, 203d, 203f, 203e may include fuses 450. The fuses 450 may be adapted to protecting the six batteries 410a, 410b, 610c, 810d, 1010e, 1010f from high currents.

By way of example, the electrically powered rotary-wing aircraft may include an automatic flight control system 460 that controls the eight thrust producing units 203a, 203b, 203h, 203c, 203g, 203d, 203f, 203e and the six batteries 410a, 410b, 610c, 810d, 1010e, 1010f.

Illustratively, the electrical drive system 1000 may include a battery control system 470 that is coupled to the automatic flight control system 460 and monitors a status of at least one battery of the six batteries 410a, 410b, 610c, 810d, 1010e, 1010f. As shown in FIG. 10, the battery control system may monitor the status of all six batteries 410a, 410b, 610c, 810d, 1010e, 1010f.

The status may include at least one of a temperature, a charging level, an outgoing current, a consumption of energy, or a remaining time of operationality of the at least one battery of the six batteries 410a, 410b, 610c, 810d, 1010e, 1010f.

If desired, the battery control system 470 may be able to disconnect one or more of the six batteries 410a, 410b, 610c, 810d, 1010e, 1010f from one or more of the electric motors to which the battery is coupled under predefined conditions. As an example, the battery control system 470 may disconnect a battery from the respective electric motors if the temperature of the battery exceeds a predetermined threshold. As another example, the battery control system 470 may disconnect a battery from the respective electric motors if the charging level of the battery drops below a predetermined threshold.

Illustratively, the electrical drive system 1000 may include a motor control system 471, 472 that is coupled to the automatic flight control system 460 and controls the functions and power needs of the three electric motors 380, 383, 386 of the eight thrust producing units 203a, 203b, 203h, 203c, 203g, 203d, 203f, 203e.

The automatic flight control system 460 may receive status information about the six batteries 410a, 410b, 610c, 810d, 1010e, 1010f from the battery control system 470 and status information about the functions and power needs of the three electric motors 380, 383, 386 of the eight thrust producing units 203a, 203b, 203h, 203c, 203g, 203d, 203f, 203e from the motor control system 471, 472. Illustratively, the automatic flight control system 460 may direct the battery control system 470 to disconnect the one or more batteries and/or direct the motor control system 471, 472 to individually increase or decrease the output of one or more of the electric motors 380, 383, 386.

If desired, a first subset of the eight thrust producing units (e.g., thrust producing units 203b, 203c, 203d, 203e) may be located on a portside and a second subset of the eight thrust producing units (e.g., thrust producing units 203a, 203h, 203g, 203f) may be located on a starboard side of an electrically powered rotary-wing aircraft (e.g., as illustratively shown for electrically powered rotary-wing aircraft 200 of FIG. 2).

Illustratively, the motor control system 471, 472 may include a left motor control system 471 that controls the functions and power needs of the electric motors located on the portside of the electrically powered rotary-wing aircraft, and a right motor control system 472 that controls the functions and power needs of the electric motors located on the starboard side of the electrically powered rotary-wing aircraft.

In the second configuration, in case of a failure of half of the second predetermined number of batteries (i.e., three of the six batteries) 410a, 410b, 610c, 810d, 1010e, 1010f the remaining functioning three batteries of the six batteries 410a, 410b, 610c, 810d, 1010e, 1010f may supply electric power to at least one electric motor of the three electric motors 380, 383, 386 in at least seven of the eight thrust producing units 203a, 203b, 203h, 203c, 203g, 203d, 203f, 203e.

As an example, in case of a failure of the first, second, and third batteries 410a, 410b, 610c, or batteries 410a, 410b, and 810d, or batteries 410a, 410b, and 1010e, or batteries 410a, 410b, and 1010f, or batteries 410a, 610c, and 810d, or batteries 410b, 610c, and 810d, or batteries 410a, 1010e, and 1010f, or batteries 410b, 1010e, and 1010f, the remaining functioning batteries may supply electric power to at least one electric motor in each one of the eight thrust producing units 203a, 203b, 203h, 203c, 203g, 203d, 203f, 203e.

As another example, in case of a failure of the first, third, and fifth batteries 410a, 610c, 1010e, or batteries 410a, 810d, and 1010e, or batteries 410a, 610c, and 1010f, or batteries 410a, 810d, and 1010f, or batteries 410b, 610c, and 1010e, or batteries 410b, 810d, and 1010e, or batteries 410b, 610c, and 1010f, or batteries 410b, 810d, and 1010f, the remaining functioning batteries supply electric power to at least one electric motor in seven of the eight thrust producing units 203a, 203b, 203h, 203c, 203g, 203d, 203f, 203e, while all electric motors in only one of the eight thrust producing units 203a, 203b, 203h, 203c, 203g, 203d, 203f, 203e is without a power supply. In some scenarios, a safe flight of the electrically powered rotary-wing aircraft may be ensured with all but one (i.e., seven of the eight) thrust producing units.

Illustratively, in the first and second configuration described above, in case of a failure of one of the six batteries 410a, 410b, 610c, 810d, 1010e, 1010f the remaining functioning batteries of the six batteries 410a, 410b, 610c, 810d, 1010e, 1010f may supply electric power to at least one electric motor of the three electric motors 380, 383, 386 in each one of the eight thrust producing units 203a, 203b, 203h, 203c, 203g, 203d, 203f, 203e in order to enable at least a safe flight of the electrically powered rotary-wing aircraft.

For example, in case of a failure of the first battery 410a, the first electric motor 380 of four of the eight thrust producing units 203a, 203b 203h, 203c, 203g, 203d, 203f, 203e may cease functioning, while the second and third electric motors 383, 386 of these four thrust producing units and the three electric motors 380, 383, 386 of the other four of the eight thrust producing units 203a, 203b 203h, 203c, 203g, 203d, 203f, 203e continue to receive electric power from the remaining functioning batteries. Thus, all eight thrust producing units 203a, 203b, 203h, 203c, 203g, 203d, 203f, 203e have at least two electric motors of the three electric motors 380, 383, 386 that receive electric power from functioning batteries.

Illustratively, in the first and second configuration described above, in case of a failure of all but one of the six batteries 410a, 410b, 610c, 810d, 1010e, 1010f such that only a single battery of the six batteries 410a, 410b, 610c, 810d, 1010e, 1010f remains functioning, the single battery supplies electric power to at least one electric motor of the three electric motors 380, 383, 386 in four of the eight thrust producing units 203a, 203b, 203h, 203c 203g, 203d, 203f, 203e in order to enable at least a safe emergency landing of the electrically powered rotary-wing aircraft.

For example, in the first and second configuration described above, in case of a failure of all but the first battery 410a (i.e., the second, third, fourth, fifth, and sixth battery 410b, 610c, 810d, 1010e, 1010f fail), all three electric motors 380, 383, 386 of thrust producing units 203g, 203d, 203f, 203e cease functioning, while the first motor 380 of thrust producing units 203a, 203b, 203h, 203c may continue to receive electric power from the remaining functioning battery 410a.

It should be noted that modifications to the above-described embodiments are within the common knowledge of the person skilled in the art and, thus, also considered as being part of the present disclosure.

For instance, FIG. 4 to FIG. 10 show several different electrical drive systems 400, 500, 600, 700, 800, 900, 1000 that each include an even number of thrust producing units. However, the electrical drive systems may include an odd number of thrust producing units instead. Preferably, in case of an odd number of thrust producing units, a subset with an odd number of these thrust producing units may be located on the longitudinal axis of the electrically powered rotary-wing aircraft (e.g., longitudinal axis 202 of electrically powered rotary-wing aircraft 200 of FIG. 2). Preferably, the remaining subset with an even number of these thrust producing units is divided in a first half that is located on the portside and a second half that is located on the starboard side of the electrically powered rotary wing aircraft.

Furthermore, a different second predetermined number of batteries 410a, 410b, 610c, 810d, 1010e, 1010f may be selected. The second predetermined number of batteries may be selected between two and the total number of electric motors in the electrically powered rotary-wing aircraft. The selected number of batteries may be a trade-off between safety and additional weight during operation of the electrically powered rotary-wing aircraft. In fact, safety and weight may both increase with the number of batteries.

Moreover, the electrical drive unit 330 of FIG. 3 is merely an example of an electrical drive unit with two or more electric motors. Other configurations of an electrical drive unit with redundant electric motors are known to the person skilled in the art. A more detailed discussion of such an electrical drive unit is therefore omitted for briefness and conciseness.

In addition, the wires of cable harness 340 of FIG. 4 or FIG. 6 are shown with a single connection between the batteries and the electric motors. For example, wires 441 of FIG. 4 are shown with a single line between first battery 410a and first electric motor 380 of first thrust producing unit 203a. However, all shown wires may include all the connectivity that is required to supply power from a battery to an electric motor. For example, wires 441 of FIG. 4 may include two wires if the first electric motor 380 is a DC motor: one wire between the positive terminal of the battery 410a and the electric motor 380 and another wire between the negative terminal of the battery 410a and the electric motor 380. If desired, the wires may include a switch to disconnect the battery from one or more electric motors. The battery control system 470 and/or the motor control system 471, 172 may control the switch.

Furthermore, each thrust producing unit of FIG. 4 to FIG. 10 is shown to have either two or three electric motors. However, if desired, some thrust producing units may have two electric motors and other thrust producing units may have three electric motors. Some thrust producing units may have more than three electric motors, if desired. For example, some thrust producing units may have four electric motors.

Moreover, the cable harness 340 of FIG. 8 to FIG. 10 shows illustrative connections between the first predetermined number of thrust producing units and the second predetermined number of batteries. However, different connections between the first predetermined number of thrust producing units and the second predetermined number of batteries are possible as shown above with respect to the first and second configurations of the cable harness 340 of FIG. 10. Yet other configurations of the cable harness 340 of FIG. 10 are possible and within the common knowledge of a person skilled in the art. For example, the electric motors 380, 383, 386 of the first thrust producing unit 203a may be coupled to the first, second, and third batteries 410a, 410b, 610c, respectively, the electric motors 380, 383, 386 of the second thrust producing unit 203b may be coupled to the first, second, and fourth batteries 410a, 410b, 810d, respectively, the electric motors 380, 383, 386 of the third thrust producing unit 203h may be coupled to the first, second, and fifth batteries 410a, 410b, 1010e, respectively, the electric motors 380, 383, 386 of the fourth thrust producing unit 203c may be coupled to the first, second, and sixth batteries 410a, 410b, 1010f, respectively, the electric motors 380, 383, 386 of the fifth thrust producing unit 203g may be coupled to the first, third, and fourth batteries 410a, 610c, 810d, respectively, the electric motors 380, 383, 386 of the sixth thrust producing unit 203d may be coupled to the second, third, and fourth batteries 410b, 610c, 810d, respectively, the electric motors 380, 383, 386 of the seventh thrust producing unit 203f may be coupled to the first, fifth, and sixth batteries 410a, 1010f, 1010e, respectively, and the electric motors 380, 383, 386 of the eighth thrust producing unit 203e may be coupled to the second, fifth, and sixth batteries 410b, 1010e, 1010f, respectively.

REFERENCE LIST 100 aircraft
101 fuselage
102 cabin
103a first thrust producing unit 103b second thrust producing unit
104 portside
105 starboard side
106 vertical axis
107 portside wing
108 starboard side wing
200 rotary-wing aircraft
201 lateral axis
202 longitudinal axis
203a, 203b, 203c, 203d, 203e, 203f, 203g, 203h thrust producing unit
300 thrust producing unit
330 electrical drive unit
331 rotor
340 cable harness
341, 342, 343 wires
380 first electric motor
383 second electric motors
386 additional electric motor
400 electrical drive system
410a first battery
410b second battery
420 electric power system
441, 442, 443, 444 wires
450 fuse
460 automatic flight control system
470 battery control system
471 motor control system right
472 motor control system left
500 electrical drive system
520 electric power system
600 electrical drive system
610c battery
611, 612, 613, 614, 621, 622, 623, 624, 631, 632, 633, 634 wires
620 electric power system
700 electrical drive system
720 electric power system
800 electrical drive system
810d battery
820 electric power system
900 electrical drive system
920 electric power system
1000 electrical drive system
1010e, 1010f battery
1020 electric power system

What is claimed is:

1. An electrically powered rotary-wing aircraft comprising:
a first predetermined number of thrust producing units, wherein each one of the first predetermined number of thrust producing units comprises:
a rotor, and
an electrical drive unit with at least two electric motors for driving the rotor; and
a second predetermined number of batteries for providing electricity to the at least two electric motors of the first predetermined number of thrust producing units;
wherein the first and second predetermined numbers are greater than one, each battery of the second predetermined number of batteries is coupled to at most one electric motor of the at least two electric motors of any one of the first predetermined number of thrust producing units and to at least two different electric motors of the at least two electric motors of at least two different thrust producing units of the first predetermined number of thrust producing units, and wherein each electric motor of the at least one of the first predetermined number of thrust producing units is coupled to at most one of the second predetermined number of batteries.

2. The electrically powered rotary-wing aircraft of claim 1 wherein the at least two electric motors of each one of the first predetermined number of thrust producing units are coupled to different batteries of the second predetermined number of batteries.

3. The electrically powered rotary-wing aircraft of claim 1 wherein the at least two electric motors of any pair of the first predetermined number of thrust producing units are coupled to a different subset of batteries of the second predetermined number of batteries.

4. The electrically powered rotary-wing aircraft of claim 1 further comprising:
a cable harness that transmits electric power from the second predetermined number of batteries to the at least two electric motors of the first predetermined number of thrust producing units.

5. The electrically powered rotary-wing aircraft of claim 4 further comprising:
fuses in connections between the second predetermined number of batteries and the at least two electric motors of the first predetermined number of thrust producing units.

6. The electrically powered rotary-wing aircraft of claim 5 wherein the fuses are adapted to protecting the second predetermined number of batteries from high currents.

7. The electrically powered rotary-wing aircraft of claim 1 further comprising:
an automatic flight control system that controls the first predetermined number of thrust producing units and the second predetermined number of batteries.

8. The electrically powered rotary-wing aircraft of claim 7 further comprising:
a battery control system that is coupled to the automatic flight control system and monitors a status of at least one battery of the second predetermined number of batteries.

9. The electrically powered rotary-wing aircraft of claim 8 wherein the status comprises at least one of a temperature, a charging level, an outgoing current, a consumption of energy, or a remaining time of operationality of the at least one battery of the second predetermined number of batteries.

10. The electrically powered rotary-wing aircraft of claim 7 further comprising:
a motor control system that is coupled to the automatic flight control system and controls the functions and power needs of the at least two electric motors of the first predetermined number of thrust producing units.

11. The electrically powered rotary-wing aircraft of claim 1 wherein in case of a failure of one of the second predetermined number of batteries, the remaining functioning batteries of the second predetermined number of batteries supply electric power to at least one electric motor of the at least two electric motors in each one of the first predetermined number of thrust producing units in order to enable at least a safe flight of the electrically powered rotary-wing aircraft.

12. The electrically powered rotary-wing aircraft of claim 1 wherein in case of a failure of all but one of the second predetermined number of batteries, such that only a single battery of the second predetermined number of batteries remains functioning, the single battery supplies electric power to at least one electric motor of the at least two electric motors in at least half of the first predetermined number of thrust producing units in order to enable at least a safe emergency landing of the electrically powered rotary-wing aircraft.

13. An electrically powered rotary-wing aircraft comprising:
a first predetermined number of thrust producing units, wherein each one of the first predetermined number of thrust producing units comprises:
a rotor, and
an electrical drive unit with at least two electric motors for driving the rotor;
a second predetermined number of batteries for providing electricity to the at least two electric motors of the first predetermined number of thrust producing units;
an automatic flight control system that controls the first predetermined number of thrust producing units and the second predetermined number of batteries; and
a motor control system that is coupled to the automatic flight control system and controls the functions and power needs of the at least two electric motors of the first predetermined number of thrust producing units;
wherein the first and second predetermined numbers are greater than one, each battery of the second predetermined number of batteries is coupled to at most one electric motor of the at least two electric motors of any one of the first predetermined number of thrust producing units and to at least two different electric motors of the at least two electric motors of at least two different thrust producing units of the first predetermined number of thrust producing units, and wherein each electric motor of the at least one of the first predetermined number of thrust producing units is coupled to at most one of the second predetermined number of batteries;
wherein a first subset of the first predetermined number of thrust producing units is located on a portside and a second subset of the first predetermined number of thrust producing units is located on a starboard side of the electrically powered rotary-wing aircraft; and
wherein the motor control system further comprises:
a left motor control system that controls the functions and power needs of the at least two electric motors of the first subset of the first predetermined number of thrust producing units located on the portside of the electrically powered rotary-wing aircraft; and
a right motor control system that controls the functions and power needs of the at least two electric motors of the second subset of the first predetermined number of thrust producing units located on the starboard side of the electrically powered rotary-wing aircraft.

14. The electrically powered rotary-wing aircraft of claim 13 further comprising:
a battery control system that is coupled to the automatic flight control system and monitors a status of at least one battery of the second predetermined number of batteries.

15. The electrically powered rotary-wing aircraft of claim 14 wherein the status comprises at least one of a temperature, a charging level, an outgoing current, a consumption of energy, or a remaining time of operationality of the at least one battery of the second predetermined number of batteries.

16. The electrically powered rotary-wing aircraft of claim 13 further comprising:
a cable harness that transmits electric power from the second predetermined number of batteries to the at least two electric motors of the first predetermined number of thrust producing units.

17. The electrically powered rotary-wing aircraft of claim 16 further comprising:
fuses in connections between the second predetermined number of batteries and the at least two electric motors of the first predetermined number of thrust producing units.

18. The electrically powered rotary-wing aircraft of claim 17 wherein the fuses are adapted to protecting the second predetermined number of batteries from high currents.

19. The electrically powered rotary-wing aircraft of claim 13 wherein in case of a failure of one of the second predetermined number of batteries, the remaining functioning batteries of the second predetermined number of batteries supply electric power to at least one electric motor of the at least two electric motors in each one of the first predetermined number of thrust producing units in order to enable at least a safe flight of the electrically powered rotary-wing aircraft.

20. The electrically powered rotary-wing aircraft of claim 13 wherein in case of a failure of all but one of the second predetermined number of batteries, such that only a single battery of the second predetermined number of batteries remains functioning, the single battery supplies electric power to at least one electric motor of the at least two electric motors in at least half of the first predetermined number of thrust producing units in order to enable at least a safe emergency landing of the electrically powered rotary-wing aircraft.

* * * * *